United States Patent Office.

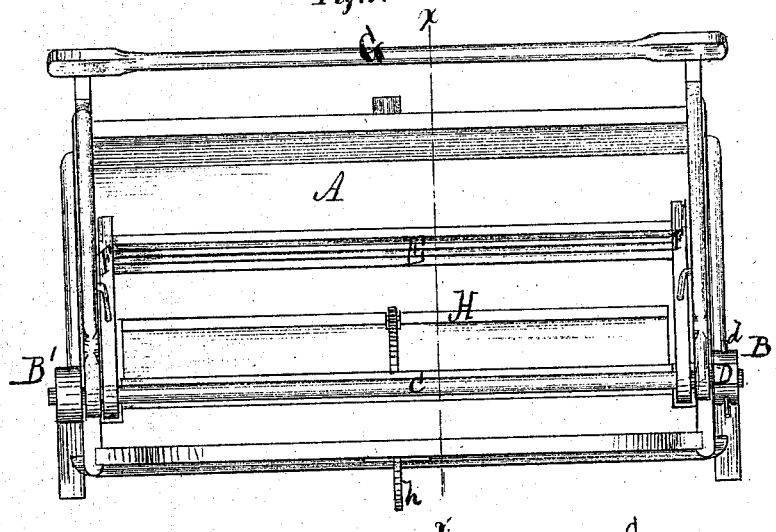
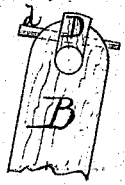
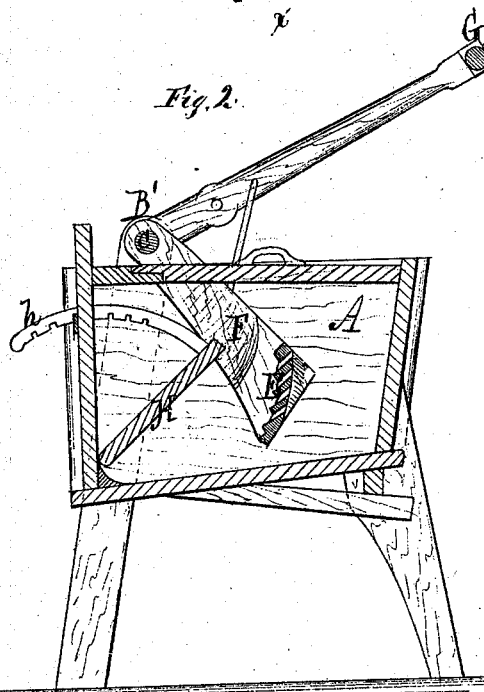

ABRAHAM MUTERSBAUGH, OF LEWINSVILLE, VIRGINIA.

Letters Patent No. 107,707, dated September 27, 1870.

IMPROVEMENT IN WASHING-MACHINES.

The Schedule referred to in these Letters Patent and making part of the same.

*To all whom it may concern:*

Be it known that I, ABRAHAM MUTERSBAUGH, of Lewinsville, in the county of Fairfax and State of Virginia, have invented a new and useful Washing-Machine; and I do hereby declare that the following is a full, clear, and exact description thereof, sufficient to enable those skilled in the art to which my invention appertains to make and use the same, reference being had to the accompanying drawing making part of this specification, in which—

Figure 1 is a plan or top view of my improvement, with the lid removed.

Figure 2 is a transverse vertical section, taken in the line $x\ x$, fig. 1.

Figure 3 is an enlarged view of a device hereinafter more particularly referred to.

The nature of my invention consists in constructing the beater of peculiar form, with longitudinal openings therein; also, in so arranging it that it can be easily removed and replaced; also, in providing an adjustable wash-board for co-operation with the beater.

The tub A is oblong in form, and rests upon legs of suitable height.

Projecting upward from the ends, on the rear side, are two standards, B B', in which are journaled the ends of a shaft, C, to which are attached the arms which hold the beater, and the arms by which it is operated.

The standard B is provided with a removable follower, D, which is held in place by a pin, $d$.

The beater E is made in one piece, if desired, or it may be made of several pieces, fastened together at the ends. It is concavo-convex in form, with longitudinal slots extending for nearly its entire length.

The beater is placed with its concave side toward the rear of the tub, and its ends are attached to arms F, the upper ends of which are secured to the shaft C, so as to move with it.

The shaft C is provided with a handle, G, consisting of two arms connected by a bar, by means of which the beater is operated.

In the rear of the tub is a wash-board, H, having its ends journaled in the ends of the tub, so as to bring its lower edge near the lower rear corner of the tub, and having a curved notched bar, $h$, pivoted to its upper edge, and passing through a slot in the rear side of the tub, by which means it is adjusted to any suitable angle.

In operating this machine the lower edge of the beater carries the clothes toward the rear of the tub, pressing and squeezing them against the wash-board, and turning them over, so that at every oscillation the beater engages with different portions of the clothing, and successively comes in contact with all portions, rubbing them sufficiently hard to cleanse them without injury.

When the machine is not in use, the follower D is removed, and the beater taken out and dried, and put out of the way.

What I claim as new, and desire to secure by Letters Patent, is—

1. The adjustable wash-board H, arranged as shown and described.

2. The concavo-convex beater E, formed with longitudinal slots, in combination with the adjustable wash-board H, as shown and described.

ABRAHAM MUTERSBAUGH.

Witnesses:
E. R. BROWN,
C. C. THEAKER.